United States Patent Office 3,536,717
Patented Oct. 27, 1970

3,536,717
NUCLEAR VINYLATION OF PHENOLS
Joseph T. Arrigo, Mount Prospect, Ill., assignor to Universal Oil Products Company, Des Plaines, Ill., a corporation of Delaware
No Drawing. Continuation-in-part of application Ser. No. 575,549, Aug. 29, 1966. This application Mar. 22, 1968, Ser. No. 715,171
Int. Cl. C07c 39/18
U.S. Cl. 260—289          8 Claims

ABSTRACT OF THE DISCLOSURE

A process for the nuclear vinylation of phenols. An N,N'-bis(2,2 - dihydrocarbylethylidene) - 2,2 - dihydrocarbylethylidenediamine is reacted with a phenol to effect nuclear vinylation thereof.

RELATED APPLICATIONS

This application is a continuation-in-part application of a copending application Ser. No. 575,549, filed Aug. 29, 1966, which is in turn a continuation-in-part application of a copending application Ser. No. 230,713 filed Oct. 15, 1962, and now abandoned.

BACKGROUND OF THE INVENTION

Previously, (substituted-vinyl)phenols have been prepared by devious methods. One such method involves the catalytic cracking of 2,2-bis(4-hydroxyphenyl)propane to give phenol and the desired p-(1-methylvinyl)phenol. Another method comprises the condensation of phenol and 2-methylallylchloride to give 2-methylallylphenyl ether, followed by the application of heat to effect the migration of the substituted allyl group to form the o-methylallyl derivative of phenol (Claisen rearrangement). The latter phenol is thereafter isomerized to the desired (2,2-dimethylvinyl)-phenol by the application of heat and in the presence of a catalyst.

It has been observed that the nuclear vinylation of phenols can be simplified by utilizing an N-(2,2-dihydrocarbylethylidene) - 2,2 - dihydrocarbylvinylamine, hereinafter referred to as an enimine, as a vinylating agent. The described enimine is a thermal decomposition product of an N,N'-bis(2,2-dihydrocarbylethylidene)-2,2-dihydrocarbylethylidenediamine, hereinafter referred to as a hydroamide. Heretofore, the use of said hydroamide per se as a vinylation agent has been disregarded. It has been considered that the polyfunctional character of this reactive species would, when the latter is heated in the presence of a phenol, cause it to give rise to a diverse mixture of products precluding any acceptable yield of the desired vinylation products. However, it has now been found that said hydroamide can be utilized per se as a vinylating agent for phenols without adversely effecting the yield of the desired vinylation product.

It is therefore an object of this invention to present an improved process for the nuclear vinylation of phenols utilizing an N,N'-bis(2,2-dihydrocarbylethylidene)-2,2-dihydrocarbylethylidenediamine as a vinylating agent.

SUMMARY OF THE INVENTION

In one of its broad aspects this invention embodies a process for the preparation of a (2,2-dihydrocarbylvinyl)-phenol which comprises reacting a phenol and an N,N'-bis(2,2 - dihydrocarbylethylidene) - 2,2,- dihydrocarbylethylidenediamine at a temperature of from about 100° C. to about 300° C.

Another embodiment of the present invention is in a process for the preparation of a (2,2-dialkylvinyl)phenol which comprises reacting a phenol and an N,N'-bis(2,2-dialkylethylidene) - 2,2 - dialkylethylidenediamine at a temperature of from about 100° C. to about 300° C.

Still another embodiment of the present invention is in a process for the preparation of a (2,2-dimethylvinyl)-phenol which comprises reacting a phenol and N,N'-bis-(2,2 - dimethylethylidene) - 2,2 - dimethylethylidenediamine also known as N,N'-diisobutylidene-2-methyl-1,1-propanediamine, at a temperature of from about 100° C. to about 300° C.

Other objects and embodiments of this invention will become apparent in the following detailed specification.

In accordance with the process of the present invention a phenol is reacted with an N,N'-bis(2,2-dihydrocarbylethylidene) - 2,2-dihydrocarbylethylidenediamine to yield a (2,2-dihydrocarbylvinyl)phenol. Phenols which can be treated in accordance with the process of this invention include fused-ring polycyclic phenols comprising up to about 4 condensed benzene nuclei, for example, 1-naphthol, 2-naphthol, 1-hydroxyanthracene, 2-hydroxyanthracene, 9-hydroxyanthracene, 2-phenanthrol, 3-phenanthrol, 4-phenanthrol, 9-phenanthrol, 1-hydroxypyrene, 3-hydroxypyrene, 4-hydroxypyrene, 1-hydroxychrysene, 2-hydroxychrysene, 3-hydroxychrysene, 4-hydroxchrysene, 5-hydroxychrysene, 6-hydroxychrysene, 1-hydroxynaphthacene, 2-hydroxynaphthacene, 9-hydroxynaphthacene, etc. Suitable phenols may further comprise a carbocyclic and/or heterocyclic ring condensed with the benzene nucleus or condensed benzene nuclei thereof as in the case of indanols, ar-tetralols, hydroxyquinolines, hydroxybenzofurans, hydroxycoumarans, hydroxychromans, hydroxybenzothiophenes, and the like. The phenols of this invention further include the polyhydric phenols, for example, dihydric phenols such as 1,2-dihydroxybenzene, 1,5-dihydroxynaphthalene, 1,2-dihydroxyanthracene, 1,2-dihydroxyphenanthrene, 3,4-dihydroxypyrene, 1,2-dihydroxychrysene, etc., including the various position isomers thereof, for example, 1,3-dihydroxybenzene, 1,4-dihydroxybenzene, etc. Additional polyhydric phenols comprising more than two hydroxyl substituents, and particularly fused-ring polynuclear polyhydric phenols, are also subject to treatment in accordance with the present process. It is generally preferred to employ a polyhydric phenol comprising at least one benzene nucleus containing not more than three, and preferably not more than two, hydroxyl substituents attached to the same benezene nucleus. Such polyhydric phenols include 1,4,5-trihydroxynaphthalene, 1,4,5,8-tetrahydroxynaphthalene, 1,2,5-trihydroxyanthracene, 1,2,8-trihydroxyanthracene, 1,2,6-trihydroxyanthracene, 3,4,5-trihydroxyphenanthrene, and the like.

The above-described phenols may further comprise one or more substituent groups which are substantially inert under reaction conditions and substituted on the benzene nucleus or condensed benzene nuclei thereof provided that said benzene nucleus or condensed benzene nuclei contains a labile hydrogen atom in an ortho and/or para position to a hydroxyl substituent. For example, a suitable phenol may further comprise an alkyl, cycloalkyl, alkenyl, cycloalkenyl, aralkyl, alkaryl, aralkenyl, aryl, alkoxy, aryloxy, alkenoxy, diarylamino, arylalkylamino, dialkylamino, dialkylaminoalkyl, arylazo, hydroxyalkyl, alkoxyalkyl, aryloxyalkyl, alkenoxyalkyl, alkylmercapto, alkenylmercapto, arylmercapto, carboalkoxy, carbamyl, arylsulfinyl, arylsulfonyl, alkylsulfinyl, alkylsulfonyl, etc., substituent containing up to about 20 carbon atoms, and also cyano, formamido, acylamido, sulfonamido, halo, nitro, and the like substituents. Examples of the last mentioned nuclear-substituted phenols include the ortho, meta, and para isomers of methylphenol, ethylphenol, cyclopentylphenol, allylphenol, cyclopentenylphenol, benzylphenol, vinylphenol, beta-styrylphenol, phenylphenol, methoxyphenol, pentoxyphenol, vinyloxyphenol, cyanophenol, N,N-diethylaminophenol, N,N-diethylaminomethylphenol, formamidophenol, acetamidophenol, ethoxymethylphenol, phenoxymethylphenol, vinyloxymethylphenol, ethylmercaptophenol, vinylmercaptophenol sulfonamidophenol, chlorophenol, nitrophenol, carbomethoxyphenol, and the like. Also included are the xylenols, hydroxyazobenzene, 8-hydroxyquinoline, 2,2 - bis(4-hydroxyphenyl)propane, thymol and the like.

Also considered within the scope of this invention are phenols comprising two of the same or different monohydric, polyhydric, and polycyclic phenols, above described, wherein the aryl moieties thereof are linked through an alkylene, alkylidene, or cycloalkylidene group, or through the sulfur atom of a sulfinyl or sulfonyl group, or through a sulfur or oxygen atom, or a nitrogen atom which may be further attached to an alkyl or an acyl group.

It is to be understood that the above enumerated compounds are merely representative of a class of phenols included in the generally broad scope of this invention which is not necessarily limited thereto.

The selected phenol is reacted with an N,N'-bis-(2,2-dihydrocarbylethylidene) - 2,2 - dihydrocarbylethylidenediamine to yield a 2,2-dihydrocarbylvinyl derivative of said phenol. The described hydroamide may be represented by the general structural formula

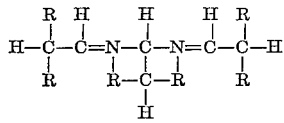

wherein R is a hydrocarbyl radical independently selected from the group consisting of alkyl, cycloalkyl, alkenyl, cycloalkenyl, aryl, aralkyl, and alkaryl, containing up to about 15 carbon atoms. The two R groups attached to the same carbon atom may together form a carbocyclic ring containing up to about 12 carbon atoms. Suitable N,N'-bis(2,2-disubstituted ethylidene) - 2,2 - disubstituted ethylidenediamines thus include N,N'-bis(2,2-dimethylethylidene)-2,2-dimethylethylidenediamine,
N,N'-bis(2-methyl-2-ethylethylidene)-2-methyl-2-ethylethylidenediamine,
N-N'-bis(2,2-diethylethylidene)-2,2-diethylethylidenediamine,
N,N'-bis(2,2-dipropylethylidene)-2,2-dipropylethylidenediamine,
N,N'-bis(2-methyl-2-propylethylidene)-2-methyl-2-propylethylidenediamine,
N,N'-bis(2,2-dicyclopentylethylidene)2,2-dicyclopentylethylidenediamine,
N,N'-bis(2-methyl-2-cyclopentylethylidene)-2-methyl-2-cyclopentylethylidenediamine,
N,N'-bis(2,2-dicyclohexylethylidene)-2-dicyclohexylethylidenediamine,
N,N'-bis(2,2-divinylethylidene)-2,2-divinylethylidenediamine,
N,N'-bis(2,2-dicyclopentenylethylidene)-2,2-dicyclopentenylethylidenediamine,
N,N'-bis(2-methyl-2-allylethylidene)-2-methyl-2-allylethylidenediamine,
N,N'-bis(2,2-diphenylethylidene)-2,2-diphenylethylidenediamine,
N,N'-bis(2-methyl-2-phenylethylidene)-2-methyl-2-phenylethylidenediamine,
N,N'-bis(2,2-dibenzylethylidene)-2,2-dibenzylethylidenediamine,
N,N'-bis(2-methyl-2-benzylethylidene)-2-methyl-2-benzylethylidenediamine,
N,N'-bis(2,2-di-p-tolylethylidene)-2,2-di-p-tolylethylidenediamine, and the like.

The aforementioned N,N'-bis(2,2-dihydrocarbylethylidene)-2,2-dihydrocarbylethylidenediamines can be prepared by any conventional or convenient process. One preferred method comprises reacting an aldehyde, which may be described as a 2,2-dihydrocarbylacetaldehyde, and ammonia to yield the desired N,N'-bis(2,2-dihydrocarbylethylidene)-2,2-dihydrocarbylethylidenediamine. The class of compounds herein described, the so-called hydroamides, have been known since 1881 when they were described by Lipp in Berichte, 14, 1746. The particular compounds utilized during the course of the present work were prepared in accordance with the method of Hasek, Elam and Martin, Journal of Organic Chemistry, 26, 1822 (1961). For example, isobutyraldehyde is reacted with aqueous ammonium hydroxide solution at about 17–24° C. to form N,N'-bis(2,2-dimethylethylidene)-2,2-dimethylethylidenediamine, also known as N,N'-diisobutylidene-2-methyl-1,1-propanediamine.

The hydrocarbyl substituent groups of the aforementioned 2,2-dihydrocarbylacetaldehyde correspond to the hydrocarbyl substituent groups of the desired (2,2-dihydrocarbylvinyl)-phenol product. A more detailed preparation is described in the examples appended hereto.

Reaction conditions relate principally to temperature. Pressure does not appear to be an important variable with respect to the present process and may be merely such as is necessary to effect a process flow in a continuous flow type of process, or autogenous pressure developed during the course of the reaction. A reaction temperature of from about 100° C. to about 300° C. is suitable at more extended reaction periods, say from about 1 hour to about 24 hours, although it is contemplated that a higher temperature may be employed in conjunction with a shorter reaction period or, vice versa, depending in part upon the particular reactants utilized. In general, it is preferred to conduct the process of this invention at a temperature of from about 150° C. to about 250° C. over a reaction period of from about 2 to about 4 hours.

The reaction of a phenol and an N,N'-bis(2,2-dihydrocarbylethylidene) - 2,2 - dihydrocarbylethylidenediamine as herein described, surprisingly results in the substitution of a 2,2-dihydrocarbylvinyl group, or groups, on the aromatic nucleus of the phenol. Although the 2,2-dihydrocarbylvinyl substituent enters predominantly in a position ortho to the phenolic hydroxyl group, para substitution also occurs. If both ortho positions are occupied, by a 2,2-dihydrocarbylvinyl group or other substituent, para entry can still occur.

Nuclear vinylation of phenols in the manner herein contemplated results in the evolution of two moles of ammonia per mole of N,N'-bis(2,2-dihydrocarbylethylidene)-2,2-dihydrocarbylethylidenediamine reacted. The ammonia is readily recovered and can be reused in the preparation of further quantities of N,N'-bis(2,2-dihydrocarbylethylidene) - 2,2 - dihydrocarbylethylidenediamine in the manner hereinbefore described. Stoichiometrically, the nuclear vinylation reaction requires a mole ratio of phenol to the N,N'-bis(2,2-dihydrocarbylethylidene)-2,2-dihydrocarbylethylidenediamine of 3:1 in the case of monosubstitution. However, it is preferred to utilize an excess of the phenol reactant as a deterrent to excess polysubstitution or undesirable side reactions. A molar ratio of from about 3 to 1 to about 6 to 1 has given good results. In many cases it is beneficial to employ an inert solvent or diluent, for example, a saturated hydrocarbon such as decane, dodecane, Decalin, Tetralin or the like, or an ether, polyether, alcohol, N,N-dialkylcarboxamide, etc., boiling in the desired range.

One preferred embodiment of the present invention relates to a process for the preparation of (2,2-dimethylvinyl)-phenol which comprises reacting phenol and N,N'-bis(2,2-dimethylethylidene) - 2,2 - dimethylethylidenediamine at a temperature of from about 150° C. to about 250° C.

In another preferred embodiment, o-cresol is reacted with N,N'-bis(2,2-dimethylethylidene)-2,2-dimethylethylidenediamine at a temperature of from about 150° C. to about 250° C. to yield 2-(2,2-dimethylvinyl)-6-methylphenol.

Another preferred embodiment is in a process for the preparation of 2-(2,2-dimethylvinyl)-3,5-dimethylphenol which comprises reacting 3,5-dimethylphenol and N,N'-bis(2,2-dimethylethylidene) - 2,2 - dimethylethylidenediamine at a temperature of from about 150° C. to about 250° C.

Still another preferred embodiment is in a process for the preparation of 7-(2,2-dimethylvinyl)-8-hydroxyquinoline which comprises reacting 8-hydroxyquinoline and N,N'-bis(2,2-dimethylethylidene) - 2,2 - dimethylethylidenediamine at a temperature of from about 150° C. to about 250° C.

The process of this invention may be effected in any suitable manner and may comprise a batch or a continuous type of reaction. In the case of a batch type of reaction, a quantity of the starting materials comprising the selected phenol and the selected N,N'-bis(2,2-dihydrocarbylethylidene) - 2,2 - dihydrocarbylethylidenediamine (and a suitable solvent, if desired) is charged to a reaction vessel and heated therein at reaction temperature over a suitable reaction period which may be determined by the substantial abatement of the evolution of ammonia from the reaction mixture. The reaction vessel may be a closed vessel, or preferably an open vessel with an overhead reflux condenser. At the expiration of a suitable reaction period, the reaction mixture is cooled and distilled, preferably at reduced pressure, to yield the desired (2,2-dihydrocarbylvinyl)phenol.

The (2,2-dihydrocarbylvinyl)phenol may be prepared in a continuous type of process wherein the reactants are charged in a continuous stream to a reactor maintained at the proper reaction conditions. The reactor may be an unpacked vessel or coil, or it may contain an inert packing material such as glass chips or beads or the like. The reaction mixture is continuously withdrawn from the reactor at a rate which will insure an adequate residence time therein. The reactor effluent is distilled to recover the desired product, the ammonia being recovered overhead for reuse and the unreacted starting materials recycled for further use as a portion of the feed material.

The following examples are presented to further illustrate the process of this invention. Said examples are for the purpose of illustration only and are not intended as a limitation in any manner of the generally broad scope of the invention as set out in the appended claims. In the nuclear vinylation reactions hereinafter presented, the reaction mixtures were homogeneous (no stirring was required) and reactions were carried out by merely refluxing the reactants at atmospheric pressure, using a condenser with an overhead line leading to a Dry Ice-acetone trap (for collecting the ammonia liberated) which was vented through a calcium chloride drying tube. Refluxing was continued until ammonia evolution had virtually ceased, after which the product was largely freed of the unreacted phenolic reaction by distillation through a Vigreux column, followed by redistillation of the product cuts through a Minical fractionation column. Product identification and distribution were obtained by gas-liquid chromatography, infrared and ultraviolet spectrophotometry, mass spectrometry and elemental and nuclear magnetic resonance analysis. Yields are based on 3 moles of (2,2-dihydrocarbylvinyl)phenol per mole of N,N'-bis(2,2 - dihydrocarbylethylidene) - 2,2 - dihydrocarbylethylidenediamine charged.

EXAMPLE I

In the preparation of N,N'-bis(2,2-dimethylethylidene)-2,2-dimethylethylidenediamine, otherwise known as N,N'-diisobutylidene-2-methyl-1,1-propanediamine, 715 grams of isobutyraldehyde was added to a stirred solution of 664 grams of concentrated ammonium hydroxide in 377 grams of water over a period of 1.5 hours. The reaction temperature was maintained at 17–24° C. After the isobutyraldehyde addition was completed, stirring was continued for an additional 1.5 hours at 20° C. The aqueous phase of the reaction mixture was then separated, ether-extracted, and the ether extract was added to the organic phase of the reaction mixture. The total organic phase was thereafter water-washed, dried over potassium hydroxide and distilled at reduced pressure. About 609 grams of crude N,N'-bis(2,2-dimethylethylidene)-2,2-dimethylethylidenediamine, equivalent to a 94% yield, was recovered. A portion of the product was redistilled through a Minical column to yield a purified product boiling at 41° C. at 0.7 mm. (208° C. corrected to 760 mm.), with a refractive index of 1.4386 at 21° C.

EXAMPLE II

N,N'-bis(2-methyl - 2 - ethylethylidene) - 2 - methyl-2-ethylethylidenediamine was prepared by the procedure of Example I using 8.28 moles of 2-methylbutyraldehyde. About 540 grams of N,N' - bis(2 - methyl-2-ethylethylidene)-2-methyl-2-ethylethylidenediamine was recovered by vacuum distillation. Redistillation through a Minical column yielded product boiling at 259–265° C. (corrected to 760 mm.) having a refractive index of 1.4498–1.4540 at 21° C.

EXAMPLE III

A mixture of 112.9 g. (1.20 moles) of phenol and 39.8 g. (0.20 mole) of N,N'-bis(2,2-dimethylethylidene)2,2-dimethylethylidenediamine was heated under reflux at a temperature of 165–191° C. for a period of about 3 hours. The reaction mixture was cooled and distilled at a reduced pressure. A 33 mole percent yield of (2,2-dimethylvinyl)phenol boiling at 91° C./7.0 mm. (M.P., 21–24° C.), and a 10 mole percent yield of 4-(2,2-dimethylvinyl)phenol, boiling at 12° C./4.4 mm. (M.P., 56–58° C.), were recovered. The index of refraction of the former at 21° C. was 1.5587. In addition there was recovered a 5 mole percent yield of 2,6-bis(2,2-dimethylvinyl)phenol boiling at 116° C./3.0 mm., and a 3 mole percent yield of 2,4-bis(2,2-dimethylvinyl)phenol boiling at 107° C./1.1 mm.

EXAMPLE IV

A mixture of 68.2 g. (0.30 mole) of 2,2-bis(4-hydroxyphenyl)propane, 43.5 g. (0.22 mole) of N,N'-bis(2,2-dimethylethylidene)-2,2-dimethylethylidenediamine and 50 g. of Decalin was heated under reflux at a temperature of 166–186° C. for a period of about 3.5 hours. The reaction mixture was cooled and distilled at a reduced pressure. The phenolic reactant was essentially completely converted to what corresponds to a mixture of mono- and bis-(2,2-dimethylvinyl) derivatives of 2,2-bis(4-hydroxyphenyl)propane. These products were isolated as a lemon-yellow, tacky distillate (88.9 g.) boiling largely at 217° C./1.2 mm.–257° C./1.9 mm.

EXAMPLE V

A mixture of 87.6 g. (0.60 mole) of 8-hydroxyquinoline, 39.5 g. (0.20 mole) of N,N'-bis(2,2-dimethylethylidene)2,2-dimethylethylidenediamine and 50 g. of Decalin was refluxed for about 2.2 hours at 176–181° C. The reaction mixture was cooled and distilled at reduced pressure. A 40 mole percent yield of what corresponds to 7-(2,2-dimethylvinyl)-8-hydroxyquinoline boiling chiefly at 138–143° C./0.7 mm. (M.P., 79–80.5° C.) was recovered.

EXAMPLE VI

A mixture of 44.8 g. (0.30 mole) of 2-(2,2-dimethylvinyl)phenol and 19.6 g. (0.10 mole) of N,N'-bis(2,2-dimethylethylidene)2,2 - dimethylethylidenediamine was refluxed for about 5 hours at 186–207° C. The reaction mixture was distilled at reduced pressure. A 21 mole percent yield of 2,6-bis(2,2-dimethylvinyl)phenol and about a 2 mole percent yield of 2,4-bis(2,2-dimethylvinyl) phenol were recovered from cuts boiling largely at 92–103° C./0.4 mm.

EXAMPLE VII

A mixture of 130.0 g. (1.20 moles) of o-cresol and 40.0 g. (0.20 mole) of N,N'-bis(2,2-dimethylethylidene)-2,2-dimethylethylidenediamine was heated under reflux at a temperature of 180–194° C. for about 3 hours. The reaction mixture was cooled and distilled at reduced pressure. A 58 mole percent yield of 2-(2,2-dimethylvinyl)-6-methylphenol boiling at 46° C./0.20 mm., and a 5 mole percent yield 2-methyl-4-(2,2-dimethylvinyl)-phenol boiling at 73° C./0.21 mm. were recovered. The refractive indices at 21° C. were 1.5435 and 1.5534, respectively. In addition, a 10 mole percent yield of 2,4-bis(2,2 - dimethylvinyl) - 6 - methylphenol boiling chiefly at 85° C./0.15 mm. was recovered.

EXAMPLE VIII

A mixture of 110.9 g. (0.91 mole) of 3,5-dimethylphenol and 28.9 g. (0.15 mole) of N,N'-bis(2,2-dimethylethylidene)-2,2-dimethylethylidenediamine was refluxed for about 2.5 hours at 191–217° C. Distillation of the reaction mixture afforded a 60 mole percent yield of 2-(2,2-dimethylvinyl)3,5-dimethylphenol, B.P. 85° C./2.2 mm., refractive index 1.5371 at 22° C. along with a 13 mole percent yield of 2,6-bis(2,2-dimethylvinyl)3,5-dimethylphenol, B.P. 93° C./0.55 mm., refractive index 1.5398 at 22° C.

EXAMPLE IX

A mixture of 78.9 g. (0.48 mole) of 2,4-dichlorophenol and 15.8 g. (0.081 mole) of N,N'-bis(2,2-dimethylethylidene) - 2,2 - dimethylethylidenediamine was refluxed for about 3 hours at 185–207° C. Distillation of the reaction mixture afforded a 30 mole percent yield of 2 - (2,2 - dimethylvinyl - 4,6 - dichlorophenol, B.P. 79° C./0.20 mm., refractive index 1.5799 at 22° C.

EXAMPLE X

A mixture of 87.9 g. (0.52 mole) of 2-phenylphenol and 18.0 g. (0.092 mole) of N,N'-bis(2,2-dimethylethylidene) - 2,2 - dimethylethylidenediamine was refluxed for about 2.5 hours at 196–231° C. Distillation of the reaction mixture afforded a 41 mole percent yield of 2-(2,2-dimethylvinyl) - 6 - phenylphenol with a B.P. of 110° C./0.21 mm. and refractive index of 1.6111 at 22° C.

I claim as my invention:

1. A process for preparing a (2,2-R,R'-vinyl) phenol, R and R' being hereinafter defined, which comprises reacting a phenol and an N,N'-bis(2,2-dihydrocarbylethylidene) - 2,2 - dihydrocarbylethylidenediamine at a temperature of from about 100° C. to about 300° C., said phenol being selected from the group consisting of phenol and nuclearly substituted carbocyclic phenols in which the substituent group or groups is substantially inert under reaction conditions and is selected from the group consisting of hydroxy, halogen, nitro, cyano, sulfonamido and radicals containing up to about 20 carbon atoms selected from the group consisting of alkyl, cycloalkyl, alkenyl, cycloalkenyl, aralkyl, aralkenyl, aryl, alkoxy, alkenoxy, dialkylamino, dialkylaminoalkyl, alkoxyalkyl, aryloxyalkyl, alkenoxyalkyl, carboalkoxy and acylamido, and said phenol being further characterized in that the benzene nucleus or condensed benzene nuclei thereof contains a labile hydrogen atom in an ortho and/or para position to a hydroxyl group; and said ethylidenediamine having the following formula

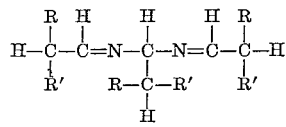

in which each R is the same and is hydrocarbyl containing up to about 15 carbon atoms and is selected from the group consisting of alkyl, cycloalkyl, alkenyl, cycloalkenyl, aryl, aralkyl and alkaryl, and each R' is the same and is hydrocarbyl containing up to about 15 carbon atoms and is selected from the group consisting of alkyl, cycloalkyl, alkenyl, cycloalkenyl, aryl, aralkyl and alkaryl, R and R' being the same or different hydrocarbyl radicals; or in which R and R' together form a carbocyclic ring containing up to about 12 carbon atoms.

2. The process of claim 1 further characterized in that said N,N'-bis(2,2 - dihydrocarbylethylidene)-2,2-dihydrocarbylethylidenediamine is an N,N'-bis(2,2-dialkylethylidene)-2,2-dialkylethylidenediamine.

3. The process of claim 2 further characterized in that said N,N' - bis(2,2 - dialkylethylidene)-2,2-dialkylethylidenediamine is N,N' - bis(2,2 - dimethylethylidene)-2,2-dimethylethylidenediamine.

4. The process of claim 3 further characterized in that said phenol is phenol.

5. The process of claim 3 further characterized in that said phenol is a cresol.

6. The process of claim 3 further characterized in that said phenol is 2,2-bis(4-hydroxyphenyl)propane.

7. The process of claim 3 further characterized in that said phenol is 2,4-dichlorophenol.

8. The process of claim 3 further characterized in that said phenol is 8-hydroxyquinoline.

No references cited.

BERNARD HELFIN, Primary Examiner

U.S. Cl. X.R.

260—613, 624, 623, 625, 622, 465, 562, 556, 574, 570.9, 611, 473, 566